US012100194B1

(12) United States Patent
Gowda et al.

(10) Patent No.: US 12,100,194 B1
(45) Date of Patent: Sep. 24, 2024

(54) IMAGE ENHANCEMENT

(71) Applicant: Apple Inc., Cupertino, CA (US)

(72) Inventors: Praveen Gowda Ippadi Veerabhadre Gowda, San Jose, CA (US); Mohammad Haris Baig, San Jose, CA (US); Quinton L. Petty, San Jose, CA (US)

(73) Assignee: Apple Inc., Cupertino, CA (US)

( * ) Notice: Subject to any disclaimer, the term of this patent is extended or adjusted under 35 U.S.C. 154(b) by 527 days.

(21) Appl. No.: 17/356,642

(22) Filed: Jun. 24, 2021

Related U.S. Application Data (60) Provisional application No. 63/051,462, filed on Jul. 14, 2020.

(51) Int. Cl.
| | |
|---|---|
| *G06V 10/60* | (2022.01) |
| *G01S 17/89* | (2020.01) |
| *G06F 3/01* | (2006.01) |
| *G06T 7/33* | (2017.01) |
| *G06T 7/521* | (2017.01) |
| *G06T 19/00* | (2011.01) |

(52) U.S. Cl.
CPC .............. *G06V 10/60* (2022.01); *G01S 17/89* (2013.01); *G06F 3/012* (2013.01); *G06T 7/33* (2017.01); *G06T 7/521* (2017.01); *G06T 19/003* (2013.01)

(58) Field of Classification Search
CPC ......... G06V 10/60; G01S 17/89; G06F 3/012; G06T 7/33; G06T 7/521; G06T 19/003
See application file for complete search history.

(56) References Cited

U.S. PATENT DOCUMENTS

| | | | |
|---|---|---|---|
| 6,788,812 B1* | 9/2004 | Wilkins | G06T 5/94 |
| | | | 382/163 |
| 9,100,640 B2* | 8/2015 | Boross | H04N 13/25 |
| 9,380,224 B2 | 6/2016 | Keskin et al. | |
| 9,491,440 B2 | 11/2016 | Atkinson | |
| 9,767,545 B2 | 9/2017 | Koppal | |
| 10,083,540 B2* | 9/2018 | Sugden | G06T 7/11 |
| 10,586,351 B1* | 3/2020 | Brailovskiy | G06T 7/90 |
| 11,017,722 B1* | 5/2021 | Kong | H10K 59/351 |
| 11,423,621 B1* | 8/2022 | Atlas | G06T 15/205 |
| 11,640,692 B1* | 5/2023 | Gowda | G06T 7/11 |
| | | | 345/419 |
| 2005/0179706 A1* | 8/2005 | Childers | G09G 3/34 |
| | | | 348/E5.073 |
| 2006/0244921 A1* | 11/2006 | Childers | H04N 9/3194 |
| | | | 353/30 |
| 2009/0091554 A1* | 4/2009 | Keam | G06F 3/0418 |
| | | | 345/175 |
| 2010/0053051 A1* | 3/2010 | Nitanda | G09G 3/2003 |
| | | | 349/116 |
| 2011/0012866 A1* | 1/2011 | Keam | G06F 3/0383 |
| | | | 345/175 |

(Continued)

*Primary Examiner* — Aaron W Carter
(74) *Attorney, Agent, or Firm* — Thompson Hine LLP (57) ABSTRACT

Various implementations disclosed herein include devices, systems, and methods that enhance an image based on depth and/or other sensor data. For example, an example process may include obtaining an image of a physical environment from a first sensor, each pixel of the image corresponding to an amount of light, obtaining depth data of the physical environment via a second sensor, and enhancing the image based on the depth sensor data.

18 Claims, 5 Drawing Sheets

(56) References Cited

U.S. PATENT DOCUMENTS

| | | | | |
|---|---|---|---|---|
| 2011/0199350 | A1* | 8/2011 | Wilson | G09G 5/02 |
| | | | | 345/207 |
| 2012/0025080 | A1* | 2/2012 | Liu | H04N 23/88 |
| | | | | 250/332 |
| 2012/0050307 | A1* | 3/2012 | Mahowald | G09G 3/2003 |
| | | | | 345/207 |
| 2012/0114218 | A1* | 5/2012 | Atkin | C12M 41/36 |
| | | | | 382/133 |
| 2014/0063039 | A1* | 3/2014 | Drzaic | G09G 5/02 |
| | | | | 345/589 |
| 2014/0240464 | A1* | 8/2014 | Lee | H04N 13/254 |
| | | | | 348/47 |
| 2018/0033145 | A1* | 2/2018 | Schoenberg | G06T 7/514 |
| 2018/0334099 | A1* | 11/2018 | Gao | B60Q 1/143 |
| 2018/0374227 | A1* | 12/2018 | Varekamp | G06T 7/521 |
| 2019/0362149 | A1* | 11/2019 | Mukhopadhyay | G06V 20/20 |
| 2020/0410699 | A1* | 12/2020 | Badrinarayanan | G06T 5/50 |
| 2021/0065392 | A1* | 3/2021 | Bleyer | H04N 13/254 |
| 2021/0065653 | A1* | 3/2021 | Keith | G09G 3/2088 |
| 2021/0117680 | A1* | 4/2021 | Chaudhri | G06F 3/04847 |
| 2021/0147077 | A1* | 5/2021 | Raabe | G01S 7/497 |
| 2021/0176449 | A1* | 6/2021 | Zhang | H04M 1/0264 |
| 2021/0266447 | A1* | 8/2021 | Ding | H04N 23/64 |
| 2023/0186846 | A1* | 6/2023 | Choi | H04N 23/57 |
| | | | | 345/76 |
| 2023/0335079 | A1* | 10/2023 | Dudrenov | G06T 5/94 |

* cited by examiner

IMAGE ENHANCEMENT

CROSS-REFERENCE TO RELATED APPLICATIONS

This application claims the benefit of U.S. Provisional Application Ser. No. 63/051,462 filed Jul. 14, 2020, which is incorporated herein in its entirety.

TECHNICAL FIELD

The present disclosure generally relates to enhancing image data, and in particular, to systems, methods, and devices for enhancing image data based on depth and/or other sensor information detected in a physical environment.

BACKGROUND

Electronic images of a physical environment may be determined based on information detected in the physical environment from image sensors. Existing techniques for providing images may be inaccurate and inefficient for low light conditions as different image sensors have different noise and low light characteristics. For example, light intensity images captured by an RGB camera may be noisy and inaccurate during particular low light conditions. An image captured during a low light condition may include night images outside or may be based on low light conditions inside a physical environment (e.g., a room) from an incandescent lamp, a fluorescent lamp, and the like. Accordingly, images captured in low light conditions may result in undesirable or unintended appearances, for example, resulting in blurry images that are inaccurately displayed and other noticeable issues.

Physical environments and objects therein have been modeled (e.g., reconstructed) by generating three-dimensional (3D) meshes, utilizing 3D point clouds, and by other means. The reconstructed meshes represent 3D surface points and other surface characteristics of the physical environments, e.g., semantic labels on points belonging to a classification of a floor, a wall, or other objects. Such reconstructions may be generated based on light intensity images and depth measurements of the physical environments, e.g., using RGB cameras and depth and/or other sensors. However, existing techniques of generating enriched geometric information (e.g., geometry and other surface characteristics such as semantic classes, material classes, and the like) or 3D geometric representations (e.g., 3D meshes) of physical environments in low light conditions may fail to provide sufficiently accurate and efficient reconstructions.

SUMMARY

Various implementations disclosed herein include devices, systems, and methods that focus on using depth sensor data to enhance light intensity images in low light conditions (e.g., at night). Reflectivity or depth data may be used to enhance the image. Additionally, ambient light data from an ambient light sensor (ALS) may also be used in conjunction with the reflectivity or depth data to enhance the image. The depth and/or reflectivity data may come from a time-of-flight sensor (e.g., light detection and ranging (LIDAR)) or infrared (IR)-based depth sensor. It may be desirable to quickly and efficiently enhance a low light image for various reasons, e.g., during real time extended reality (XR) environments that includes depictions of a physical environment including real physical objects and virtual content.

In general, one innovative aspect of the subject matter described in this specification can be embodied in methods that include the actions of obtaining an image of a physical environment from a first sensor, each pixel of the image corresponding to an amount of light, obtaining depth data of the physical environment via a second sensor, and enhancing the image by changing an intensity value or color value of one or more pixels of the image based on the depth data.

These and other embodiments can each optionally include one or more of the following features. In some implementations, the method further includes determining a reflectivity pattern of the physical environment from the second sensor or another sensor, and enhancing the image based on the reflectivity pattern.

In some implementations, the second sensor is a LIDAR sensor that acquires the depth data and reflectivity data.

In some implementations, the method further includes aligning, based on the depth data, image data from the first sensor and image data from at least one other sensor.

In some implementations, a machine learning model enhances the image based on the depth data, reflectivity data, and ambient light data.

In some implementations, the method further includes obtaining ambient light data from an ambient light sensor (ALS) of the physical environment, the ambient light data corresponding to diffuse light received by the ALS in the physical environment, the physical environment comprising a light source, and enhancing the image based on the ambient light data.

In some implementations, the method further includes determining whether to enhance the image based on the ambient light data.

In some implementations, the method further includes determining a type of light source for the light source in the physical environment based on the ambient light data, and enhancing the image based on the type of light source.

In some implementations, the image is captured in low ambient light conditions, wherein enhancing the image comprises brightening or adding color to one or more of the pixels of the image.

In some implementations, the method further includes obtaining a three-dimensional (3D) representation of the physical environment that was generated based on the depth data and image data from the enhanced image, wherein the 3D representation is associated with 3D semantic data, determining locations of objects in the physical environment based on the 3D representation, and providing pedestrian navigation to a user based on the 3D representation and the locations of the objects in the physical environment.

In some implementations, the method further includes determining a relative pose of a head of the user, and providing spatialized audio feedback to the pedestrian for the locations of the objects based on the relative pose of a head of the user.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Figure 1:
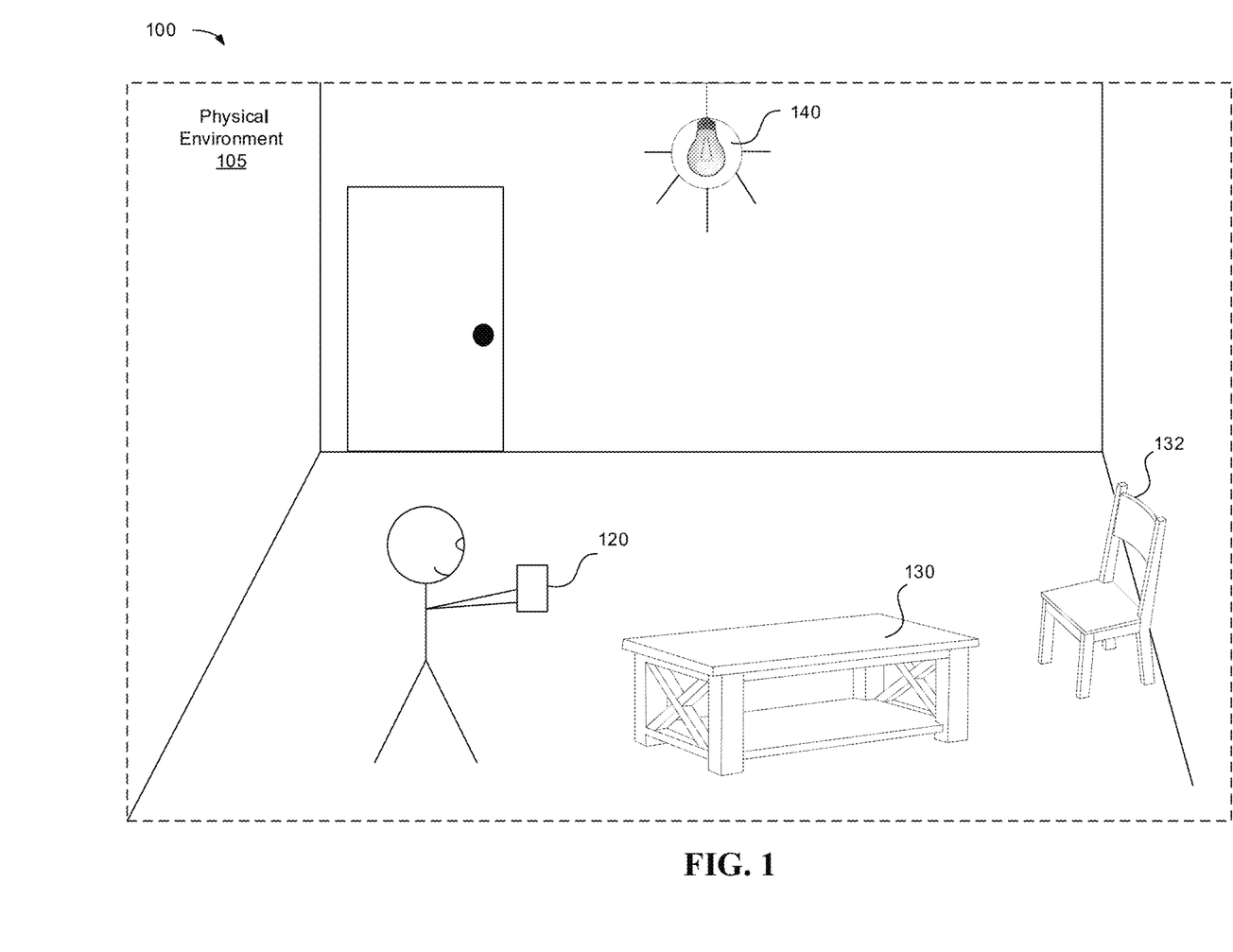
FIG. 1 is an example operating environment in accordance with some implementations.
Figure 2:
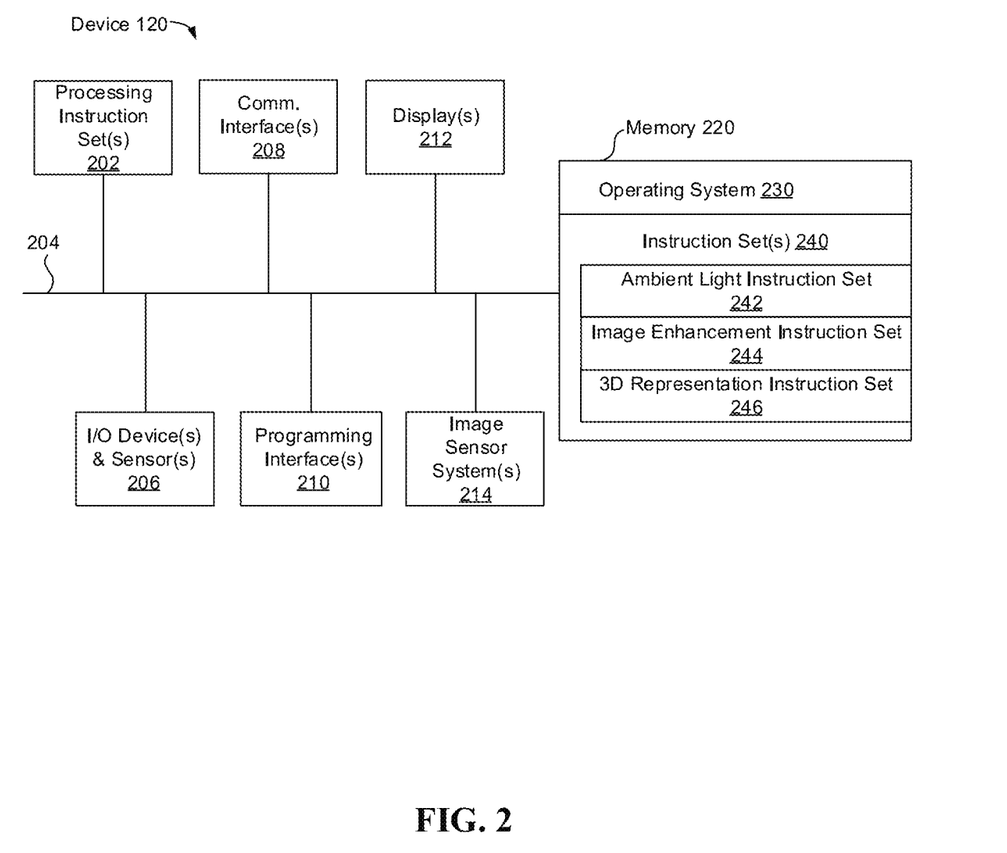
FIG. 2 is an example device in accordance with some implementations.

FIG. 1 is a block diagram of an example operating environment 100 in accordance with some implementations. In this example, the example operating environment 100 illustrates an example physical environment 105 that a table 130, a chair 132, and a light source 140. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 may include a server and a device 120. In an exemplary implementation, the operating environment 100 does not include a server, and the methods described herein are performed on the device 120.

In some implementations, the device 120 is configured to present an environment to the user. In some implementations, the device 120 includes a suitable combination of software, firmware, and/or hardware. In some implementations, the device 120 is a handheld electronic device (e.g., a smartphone or a tablet) configured to present content to the user. In some implementations, the user 102 wears the device 120 on his/her head. As such, the device 120 may include one or more displays provided to display content. For example, the device 120 may enclose the field-of-view of the user 102. In some implementations, the device 120 is replaced with a chamber, enclosure, or room configured to present content in which the user 102 does not wear or hold the device 120. In some implementations, the functionalities of a server are provided by and/or combined with the device 120. The device 120 is described in greater detail below with respect to FIG. 2.

In some implementations, a server is configured to manage and coordinate an experience for the user. In some implementations, the server includes a suitable combination of software, firmware, and/or hardware. In some implementations, the server is a computing device that is local or remote relative to the physical environment 105. In one example, the server is a local server located within the physical environment 105. In another example, the server is a remote server located outside of the physical environment 105 (e.g., a cloud server, central server, etc.). In some implementations, the server is communicatively coupled with the device 120 via one or more wired or wireless communication channels (e.g., BLUETOOTH, IEEE 802.11x, IEEE 802.16x, IEEE 802.3x, etc.). In some implementations, the functionalities of a server are provided by and/or combined with the device 120.

FIG. 2 is a block diagram of an example of the device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the device 120 includes one or more processing units 202 (e.g., microprocessors, ASICs, FPGAs, GPUs, CPUs, processing cores, and/or the like), one or more input/output (I/O) devices and sensors 206, one or more communication interfaces 208 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, and/or the like type interface), one or more programming (e.g., I/O) interfaces 210, one or more AR/VR displays 212, one or more interior and/or exterior facing image sensor systems 214, a memory 220, and one or more communication buses 204 for interconnecting these and various other components.

In some implementations, the one or more communication buses 204 include circuitry that interconnects and controls communications between system components. In some implementations, the one or more I/O devices and sensors 206 include at least one of an inertial measurement unit (IMU), an accelerometer, a magnetometer, a gyroscope, a thermometer, an ambient light sensor (ALS), one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 212 are configured to present the experience to the user. In some implementations, the one or more displays 212 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 212 correspond to diffractive, reflective, polarized, holographic, etc. waveguide displays. For example, the device 120 includes a single display. In another example, the device 120 includes a display for each eye of the user.

In some implementations, the one or more image sensor systems 214 are configured to obtain image data that corresponds to at least a portion of the physical environment 105. For example, the one or more image sensor systems 214 include one or more RGB cameras (e.g., with a complimentary metal-oxide-semiconductor (CMOS) image sensor or a charge-coupled device (CCD) image sensor), monochrome cameras, IR cameras, event-based cameras, and/or the like. In various implementations, the one or more image sensor systems 214 further include illumination sources that emit light, such as a flash. In various implementations, the one or more image sensor systems 214 further include an on-camera image signal processor (ISP) configured to execute a plurality of processing operations on the image data including at least a portion of the processes and techniques described herein.

The memory 220 includes high-speed random-access memory, such as DRAM, SRAM, DDR RAM, or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 includes a non-transitory computer readable storage medium. In some implementations, the memory 220 or the non-transitory computer readable storage medium of the memory 220 stores the following programs, modules and data structures, or a subset thereof including an optional operating system 230 and one or more applications 240.

The operating system 230 includes procedures for handling various basic system services and for performing hardware dependent tasks. In some implementations, the applications 240 are configured to manage and coordinate one or more experiences for one or more users (e.g., a single experience for one or more users, or multiple experiences for respective groups of one or more users).

The applications 240 include an ambient light instruction set 242, an image enhancement instruction set 244, and a 3D representation instruction set 246. The ambient light instruction set 242, the image enhancement instruction set 244, and the 3D representation instruction set 246 can be combined into a single application or instruction set or separated into one or more additional applications or instruction sets.

The ambient light instruction set 242 is configured with instructions executable by a processor to obtain sensor data (e.g., ambient light sensor data, motion data, etc.) to determine a level of light intensity from a light source(s) and determine a type of the light source (e.g., an incandescent lamp, a fluorescent lamp, the sun, etc.) using one or more of the techniques disclosed herein. For example, the ambient light instruction set 242 analyzes ambient light data from an ALS and motion data from a motion sensor (e.g., gyroscope, accelerometer, etc.) and/or other sources of physical environment information (e.g., camera positioning information from a camera's SLAM system, VIO, or the like) to analyze a light source(s) for image enhancement for 3D reconstruction (e.g., 3D representations of virtual content generated for an XR experience that also displays a physical environment). In some implementations, the ambient light instruction set 242 includes a light sensitivity instruction set to determine a level of light intensity from a light source(s), and a light source assessment instruction set to determine a type of the light source (e.g., an incandescent lamp, a fluorescent lamp, the sun, etc.).

The image enhancement instruction set 244 is configured with instructions executable by a processor to obtain light intensity image data (e.g., RGB data), depth data (e.g., depth sensor data from a LIDAR sensor, an IR-based depth sensor, or the like) and other sensor data (e.g., camera position information, ambient light data, etc.) and enhance the light intensity images for 3D reconstruction during acquisition of the images using one or more of the techniques disclosed herein. For example, the image enhancement instruction set 244 analyzes RGB images from a light intensity camera with a sparse depth map from a depth camera (e.g., time-of-flight sensor) and other sources of physical environment information (e.g., ambient light data from an ALS, camera positioning information from a camera's SLAM system, VIO, or the like) to enhance and brighten a low light RGB image to be utilized for 3D reconstruction. In some implementations, the image enhancement instruction set 244 includes separate instruction sets, such as a depth data accumulation instruction set, and an enhanced image data instruction set as further discussed herein with reference to FIGS. 4-5.

The 3D representation instruction set 246 is configured with instructions executable by a processor to obtains tracking information for the device, image data (e.g., RGB and depth data), the enhanced image data (if applicable, e.g., during low light conditions), and other sources of physical environment information (e.g., camera positioning information from a camera's SLAM system, VIO, or the like), and generates 3D representation data using one or more techniques disclosed herein. For example, the 3D representation instruction set 246 obtains ambient light assessment data from the ambient light instruction set 242, obtains enhanced RGB data from the image enhancement instruction set 244, obtains or generates segmentation data (e.g., RGB-S data) based on obtained image data (e.g., RGB and depth data), obtains other sources of physical environment information (e.g., camera positioning information), and generates a 3D representation (e.g., a 3D mesh representation, a 3D point cloud with associated semantic labels, or the like) for an XR experience.

Although these elements are shown as residing on a single device (e.g., the device 120), it should be understood that in other implementations, any combination of the elements may be located in separate computing devices. Moreover, FIG. 2 is intended more as functional description of the various features which are present in a particular implementation as opposed to a structural schematic of the implementations described herein. As recognized by those of ordinary skill in the art, items shown separately could be combined and some items could be separated. For example, some functional modules (e.g., applications 240) shown separately in FIG. 2 could be implemented in a single module and the various functions of single functional blocks (e.g., instruction sets) could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
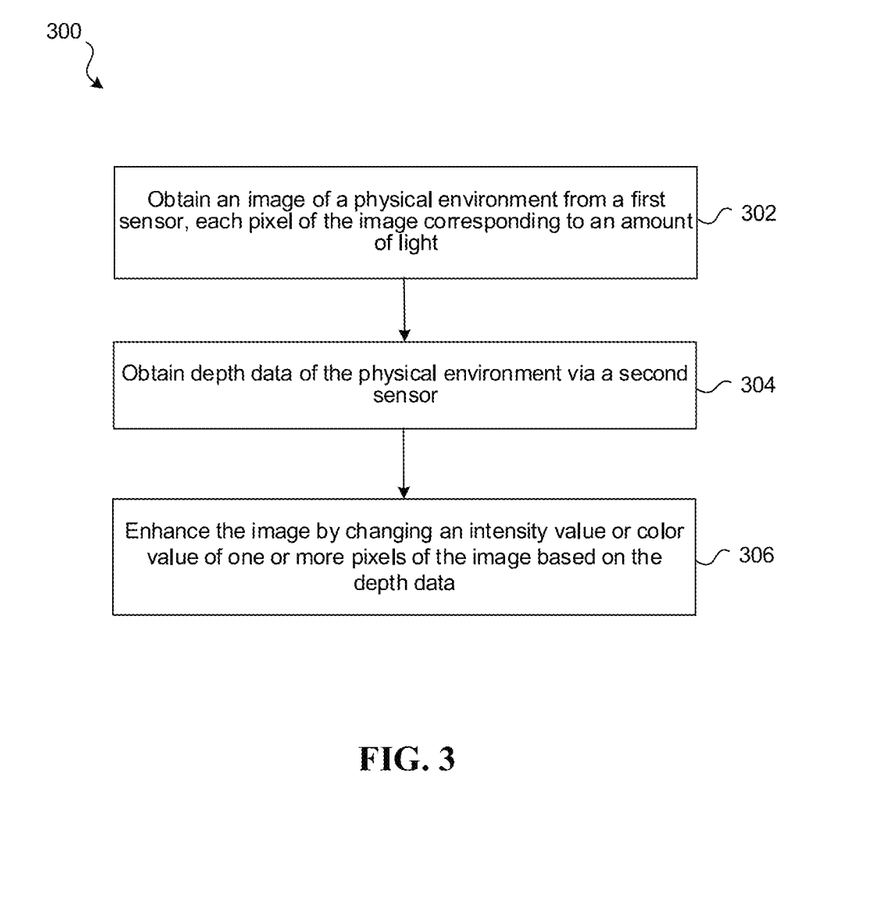
FIG. 3 is a flowchart representation of an exemplary method that enhances an image based on depth sensor data in accordance with some implementations.

FIG. 3 is a flowchart representation of an exemplary method 300 that enhances an image based on depth sensor data in accordance with some implementations. In some implementations, the method 300 is performed by a device (e.g., device 120 of FIGS. 1 and 2), such as a mobile device, desktop, laptop, or server device. The method 300 can be performed on a device (e.g., device 120 of FIGS. 1 and 2) that has a screen for displaying images and/or a screen for viewing stereoscopic images such as a head-mounted display (HMD). In some implementations, the method 300 is performed by processing logic, including hardware, firmware, software, or a combination thereof. In some implementations, the method 300 is performed by a processor executing code stored in a non-transitory computer-readable medium (e.g., a memory). The image enhancement process of method 300 is illustrated with reference to FIGS. 4-5.

At block 302, the method 300 obtains an image of a physical environment from a first sensor, each pixel of the image corresponding to an amount of light. For example, for a greyscale image, each pixel may have only a single value corresponding to a light intensity value (e.g., greyscale values in the range 0-255). For an RGB image, each pixel may have a value for each of the red, green, and blue components.

At block 304, the method 300 obtains depth data of the physical environment via a second sensor. For example, the depth sensor may be a LIDAR sensor or IR sensor. In some implementations, the method 300 may additionally obtain reflectivity data (from the same or another sensor). Additionally, or alternatively, the method 300 may obtain ambient light sensor data from an ALS.

At block 306, the method 300 enhances the image by changing an intensity value or color value of one or more pixels of the image based on the depth data. In some implementations, enhancing the image may use a machine learning model. In some implementations, the enhancement may be to brighten and/or add color to a greyscale image or to an image that lacks brightness or color due to capture in low ambient lighting. In some implementations, the enhancement may occur once per frame in a video. Alternatively, in some implementations, the enhancement may enhance multiple frames simultaneously.

In some implementations, the image of the physical environment is captured in low ambient light conditions (e.g., at night), and enhancing the image includes brightening or adding color to one or more of the pixels of the image.

In some implementations, the method 300 further includes determining a reflectivity pattern of the physical environment from the second sensor (e.g., LIDAR, IR, etc.) or another sensor (e.g., ALS, or the like), and enhancing the image based on the reflectivity pattern. In some implementations, the second sensor is a LIDAR sensor that acquires the depth data and reflectivity data.

In some implementations, the method 300 further includes aligning, based on the depth data, image data from the first sensor (e.g., RGB data from a light intensity camera) and image data from at least one other sensor (e.g., RGB data from an additional light intensity camera). For example, multiple cameras on the device may be aligned frame by frame based on the depth data to provide richer input visual signal (e.g., in low light) as different sensors have different noise and low-light characteristics. For example, some mobile devices include more than one camera to capture images. Depth data (e.g., TOF data) can be used to enable cross-utilization of data from the other cameras. For example, if there are three cameras being used, image data from camera-2 and camera-3 can be used to enhance images from camera-1. However, since the three cameras are positioned at different locations on the device, depth data from a depth sensor can be used to align data captured from camera-2 and camera-3 with camera-1 such that the data from camera-2 and camera-3 can be used to enhance images captured by camera 1 frame-by-frame.

In some implementations, the method 300 involves a machine learning model enhances the image based on the depth data, reflectivity data, and ambient light data. In some implementations, the machine learning model is a neural network (e.g., an artificial neural network), decision tree, support vector machine, Bayesian network, or the like.

In some implementations, the method 300 involves using an ALS which can guide a machine learning algorithm by providing additional input on what kind of degradations to expect in the reflectivity image from the depth data (e.g., IR, TOF, etc.). The ALS provides input into the machine learning algorithm. For example, the machine learning algorithm can learn and determine whether the light source (e.g., light source 140 in FIG. 1) is from an incandescent lamp, fluorescent lamp, the sun, etc., and enhance the RGB image based on this information. In an exemplary implementation, the method 300 further includes obtaining ambient light data from an ALS of the physical environment, the ambient light data corresponding to diffuse light received by the ALS in the physical environment, the physical environment including a light source, and enhancing the image based on the ambient light data. In an exemplary implementation, the method 300 further includes determining whether to enhance the image based on the ambient light data. For example, determine whether to initiate an enhancement instruction set, or if there is sufficient amount of light, bypass the enhancement and send the light intensity images directly to a 3D representation unit (e.g. semantic meshing, etc.). The determination may be based on a percentage of ambient light data exceeding a threshold (e.g., less than 70%) before activating the enhancement feature. For example, if the percentage of light is less than 70% in the image data (e.g., based on the ALS data), then the enhancement feature/algorithm is utilized. In an exemplary implementation, the method 300 further includes determining a type of light source (e.g., incandescent lamp, fluorescent lamp, moon, sun, etc.) for the light source in the physical environment based on the ambient light data, and enhancing the image based on the determined type of the light source (s). For example, the determined type of the light source(s) provides the algorithm the type of degradations to expect in the reflectivity image and depth data.

In some implementations, the method 300 involves guiding a visually impaired person for positional navigation. For example, the enhanced image data may be semantically labelled (e.g., via another machine learning model) used to provide pedestrian navigation and/or spatialized audio cues. In an exemplary implementation, the method 300 further includes obtaining a 3D representation of the physical environment that was generated based on the depth data and image data from the enhanced image, where the 3D representation is associated with 3D semantic data, determining locations of objects in the physical environment based on the 3D representation, and providing pedestrian navigation to a user based on the 3D representation and the locations of the objects in the physical environment. For example, a visually impaired person (e.g., a person that cannot see very well in low light conditions, or a blind person that cannot see in any light condition) could be guided with spatialized audio cues in any type of light condition. In an exemplary implementation, the method 300 further includes determining a relative pose of a head of the user, and providing spatialized audio feedback to the pedestrian for the locations of the objects based on the relative pose of a head of the user. For example, a position of the head of the user may be determined based on motion data acquired from a device on the head of the user (e.g., gyroscope or accelerometer located within a device, such as wireless headphones). The pose of the head can then be used to determine a 3D location for the spatialized audio cues to guide the user with special audio cues that aide the user. For example, walking down the street at night, audio cues may provide sounds of oncoming pedestrian or vehicle traffic on the sidewalk and/or street. Spatialized audio allows the navigation system to provide an approximate distance for an identified object to the visually impaired user. Further, the image enhancement techniques described herein, allow the navigation system to more accurately detect objects in low light conditions (e.g., at night).

In use, for the process 300, a user may acquire images of a physical environment (e.g., a room) with a device (e.g., a smartphone such as device 120) and the processes described herein would capture sensor data (e.g., ambient light sensor data, motion data, image data such as light intensity data and depth data, camera position information, etc.), assess the sensor data with respect to the light sources, determine whether there are low light conditions, and enhance the light intensity images before sending to a 3D reconstruction instruction set to create a 3D reconstruction of the physical environment (e.g., the room). In some implementations, the process 300 could provide a 3D representation for the physical environment (e.g. physical environment 105), or a particular portion of the physical environment such as an object, as it is being scanned by the user. In some implementations, an ambient light instruction set is used to determine whether the images need to be enhanced because of low light conditions and/or determine a type of light source. In some implementations, the 3D representation may be automatically displayed and updated on the user device overlaid during a live camera feed. For example, an ambient light instruction set (e.g., ambient light instruction set 242 of FIG. 2) determines ambient light assessment data associated with a type of light source(s) and a percentage of light provided by the light source(s). The ambient light assessment data is then utilized by a 3D representation instruction set (e.g., 3D representation instruction set 246 of FIG. 2), in conjunction with enhanced image data, depth data, and camera positioning information, to generate 3D representation data for a portion of (e.g., an object) or all of the scanned physical environment (e.g., as part of an XR experience).

Figure 4:
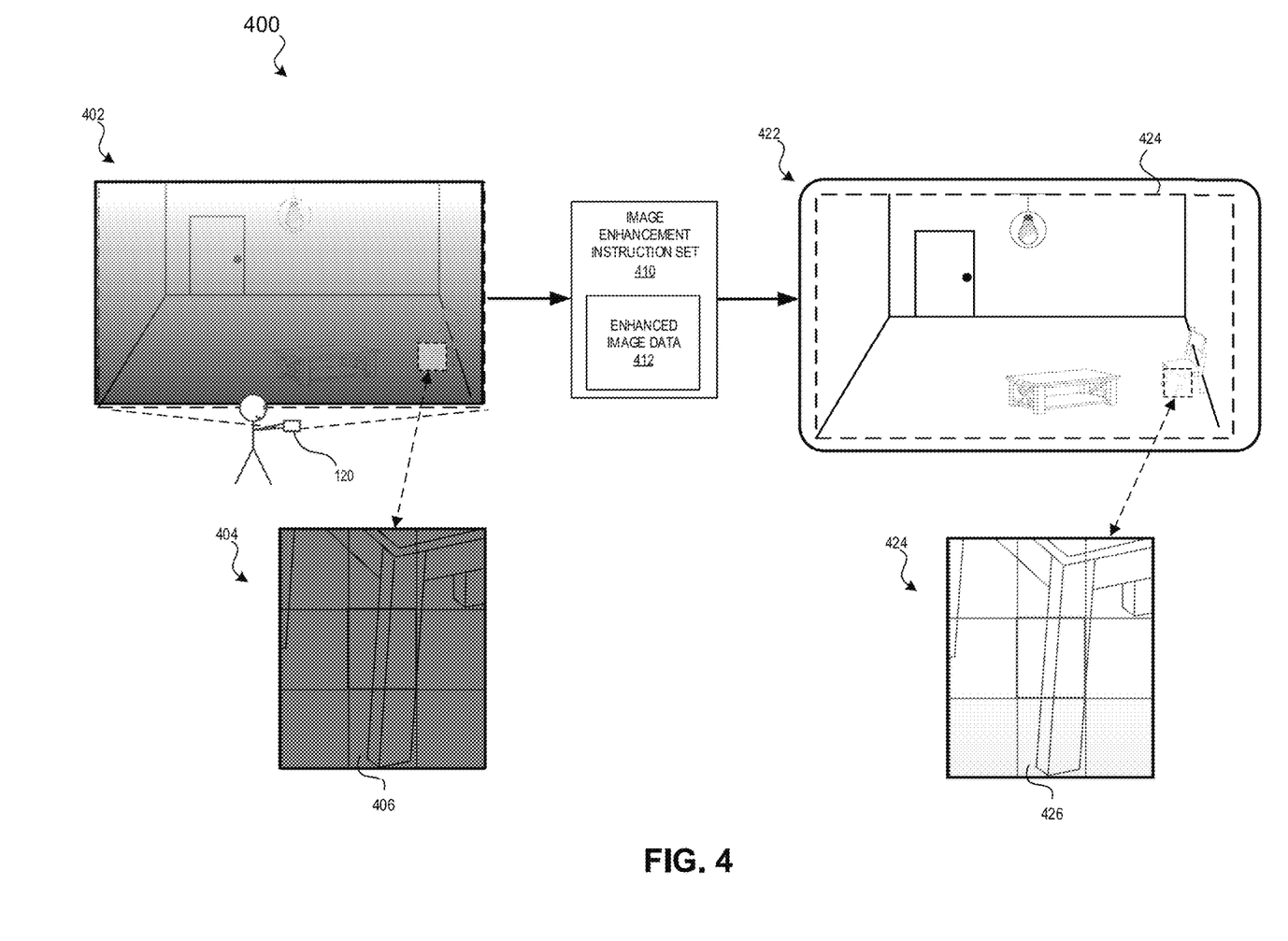
FIG. 4 illustrates an enhancement of an image based on depth sensor data in accordance with some implementations.

FIG. 4 illustrates an enhancement of a light intensity image during low light conditions based on depth sensor data in accordance with some implementations. In particular, FIG. 4 illustrates an example environment 400 in which an image enhancement instruction set 410 (e.g., image enhancement instruction set 244 of FIG. 2) can enhance the light intensity images from the acquired image data 402 which includes depth data (e.g., reflectivity data from TOF or IR sensors, RGB data, and the like). Image data 402, in the example environment 400, is an example physical environment 105 from FIG. 1 in low light (e.g. light source 140 is turned off or very dim). The image enhancement instruction set 410 enhances the image data to generate enhanced image data 412 using techniques described herein. An example of the enhanced image data (e.g., brightened image) is shown in image data 424 displayed on the user interface 422 of the device 120. In particular, the image enhancement instruction set 410 enhances the low light image 402 at the pixel level and/or at particular locations within the image data. For example, area 404 of the chair (e.g., chair 132) is shown with a pixel location 406. The enhancement instruction set 410 is trained to brighten each individual pixel. Thus, pixel location 426 represents an enhanced version the same pixel location 406 in the area 424 of the enhanced image 424. The enhanced pixels allow a 3D reconstruction instruction set to be more accurate when generating a 3D reconstruction. For example, a 3D reconstruction instruction set may be dependent on semantically labeling objects within an image which would be difficult in low light images or based on depth data alone. By enhancing the low light images, the 3D reconstruction instruction set can then better accurately determine the semantic labels for each object or area in the image data, and thus create more accurate 3D representations.

Figure 5:
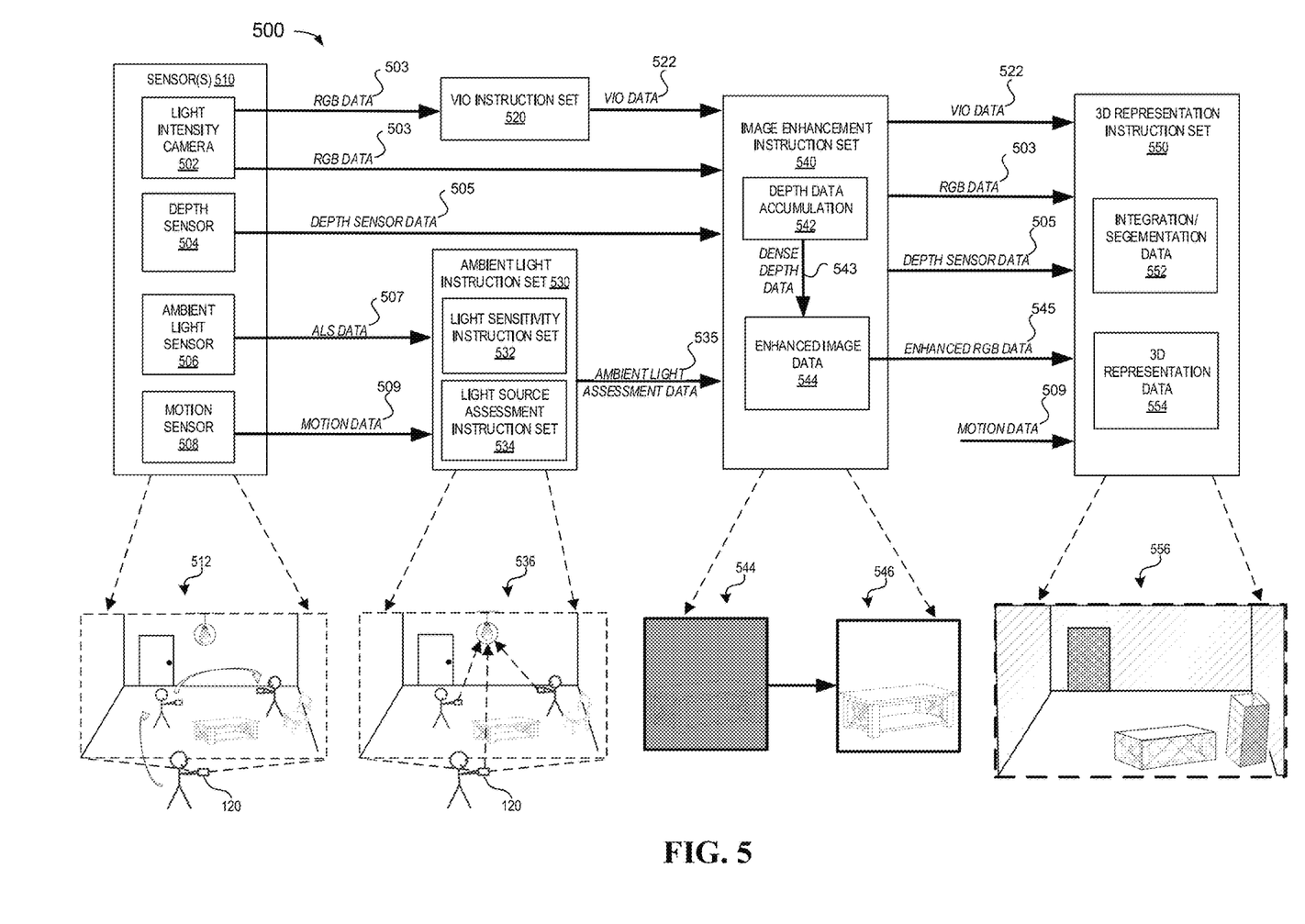
FIG. 5 illustrates a system flow diagram of an example enhancement of an image based on depth sensor data according to some implementations.

FIG. 5 is a system flow diagram of an example environment 500 that acquires sensor data including image data of a physical environment, assesses ambient light data, enhances the light intensity images for low light conditions, and generates 3D representation data for at least a portion of the physical environment using the enhanced image data in accordance with some implementations. In some implementations, the system flow of the example environment 500 is performed on a device (e.g., server or device 120 of FIGS. 1 and 2), such as a mobile device, desktop, laptop, or server device. The image data and 3D reconstruction data (e.g., virtual content in an XR environment) of the example environment 500 can be displayed on a device (e.g., device 120 of FIGS. 1 and 2) that has a screen for displaying images and/or a screen for viewing stereoscopic images such as a head-mounted display (HMD). In some implementations, the system flow of the example environment 500 is performed on processing logic, including hardware, firmware, software, or a combination thereof. In some implementations, the system flow of the example environment 500 is performed on a processor executing code stored in a non-transitory computer-readable medium (e.g., a memory).

The system flow of the example environment 500 acquires, utilizing a plurality of sensor(s) 510, light intensity image data 503 (e.g., live camera feed such as RGB from light intensity camera 502), depth image data 505 (e.g., depth image data from depth camera 504), ambient light data 507 (e.g., illuminance values from ambient light sensor(s) 506), and motion data 509 (e.g., motion trajectory data from motion sensor(s) 508) of a physical environment (e.g., the physical environment 105 of FIG. 1). Additionally, example environment 500 acquires positioning information (e.g., VIO instruction set 520 determines VIO data based on the light intensity image data 503), assesses the ambient light data to determine ambient light assessment data for the device with respect to light source(s) (e.g., the ambient light instruction set 530), enhances the light intensity image data during low light conditions (e.g., the image enhancement instruction set 540), and generates 3D representation data 554 from the acquired sensor data and enhanced image data (e.g., the 3D representation instruction set 550). In some implementations, other sources of physical environment information are acquired (e.g., camera positioning information such as position and orientation data from position sensors) as opposed to using a VIO system (e.g., VIO instruction set 520).

In an example implementation, the environment 500 includes an image composition pipeline that acquires or obtains data (e.g., image data from image source(s), ambient light data, motion data, etc.) for the physical environment. Example environment 500 is an example of acquiring image sensor data (e.g., light intensity data, depth data, ambient light data, and motion data) for a plurality of image frames. For example, as illustrated in example environment 512, a user is walking around a room acquiring sensor data from sensor(s) 510. The image source(s) may include a light intensity camera 502 (e.g., RGB camera) that acquires light intensity image data 503 (e.g., a sequence of RGB image frames), a depth camera 504 (e.g., LIDAR, TOF, etc.) that acquires depth data 505 (e.g., reflectivity data), an ambient light sensor 506 that acquires ambient light data 507, and a motion sensor that acquires motion data 509.

For positioning information, some implementations include a VIO system (e.g., VIO instruction set 520) to determine equivalent odometry information (e.g., VIO data 522) using sequential camera images (e.g., light intensity data 503) to estimate the distance traveled. In some implementations, the VIO system is run on the enhanced images as the low-light VIO systems based on visual data do not perform well. Alternatively, some implementations of the present disclosure may include a simultaneous localization and mapping (SLAM) system (e.g., position sensors within the sensors 510). The SLAM system may include a multi-dimensional (e.g., 3D) laser scanning and range measuring system that is GPS-independent and that provides real-time simultaneous location and mapping. The SLAM system may generate and manage data for a very accurate point cloud that results from reflections of laser scanning from objects in an environment. Movements of any of the points in the point cloud are accurately tracked over time, so that the SLAM system can maintain precise understanding of its location and orientation as it travels through an environment, using the points in the point cloud as reference points for the location.

In an example implementation, the environment 500 includes an ambient light instruction set 530 (e.g., ambient light instruction set 242 of FIG. 2) that is configured with instructions executable by a processor to obtain sensor data (e.g., ambient light sensor data 507 such as light intensity data and motion data 509 such as motion trajectory data) to determine a level of light intensity from a light source(s) and determine a type of the light source (e.g., an incandescent lamp, a fluorescent lamp, the sun, etc.) using one or more of the techniques disclosed herein. For example, as illustrated in example environment 536, as a user is walking around a room acquiring sensor from sensor(s) 510, ambient light instruction set 530 is determining information based on the light source (e.g., light source 140) and the location of the device and determining ambient light assessment data 535 (e.g., a level of light intensity and/or a type of light source).

In some implementations, ambient light instruction set 530 includes a light sensitivity instruction set 532 that is configured with instructions executable by a processor to determine a level of light intensity from a light source(s) based on the ambient light data 507. For example, the light sensitivity instruction set 532 of the ambient light instruction set 530 analyzes ambient light data from the ALS 506 and motion data 509 from the motion sensor(s) 508 to determine a percentage of ambient light data in the physical environment and whether that percentage exceeds a threshold (e.g., less than 70%) before activating the enhancement feature (e.g., sending ambient light assessment data 535 to the image enhancement instruction set 540). For example, if the percentage of light is less than 70% in the image data (e.g., based on the ALS data), then the enhancement feature/algorithm is utilized.

In some implementations, ambient light instruction set 530 includes a light source assessment instruction set 534 that is configured with instructions executable by a processor to determine a type of light source from a light source(s) based on the ambient light data 507. For example, the light source assessment instruction set 534 of the ambient light instruction set 530 (e.g., ambient light instruction set 242 of FIG. 2) analyzes ambient light data from the ALS 506 and motion data 509 from the motion sensor(s) 508 to determine a type of light source (e.g., incandescent lamp, fluorescent lamp, moon, sun, etc.) for the light source in the physical environment based on the ambient light data. For example, light source assessment instruction set 534 provides the kind of degradations to expect in the reflectivity image (e.g., sending ambient light assessment data 535 to the image enhancement instruction set 540). In some implementations, the light source assessment instruction set 534 uses a machine learning model, where a light source segmentation model may be configured to identify semantic labels for pixels or voxels of image data to determine and/or classify a type of light source for the light source. In some implementations, the machine learning model is a neural network (e.g., an artificial neural network), decision tree, support vector machine, Bayesian network, or the like.

In an example implementation, the environment 500 further includes an image enhancement instruction set 540 that is configured with instructions executable by a processor to obtain the sensor data from sensor(s), obtain ambient light assessment data from the ambient light instruction set 530, and generate enhanced image data 544 using one or more techniques. For example, the image enhancement instruction set 540 (e.g., image enhancement instruction set 244 of FIG. 2) analyzes RGB images from a light intensity camera 502 with a sparse depth map from a depth camera 504 (e.g., time-of-flight sensor) and other sources of physical environment information (e.g., camera positioning information such as VIO data 522 from the VIO instruction set 520, or a camera's SLAM system, or the like) to generate enhanced image data 544 for low light conditions in a physical environment. For example, image 544 was acquired in low light conditions and includes an object (e.g., a table such as table 130 of FIG. 1). The image enhancement instruction set 540, using techniques described herein, enhances the low light image 544 and generates enhanced RGB data 545 as shown in image 546. The low light image 544 is enhanced and is thus appears as a brightened image. For color images (e.g., RGB), this could include adding color at the pixel level. In some implementations, the image enhancement instruction set 540 acquires the depth sensor data 505 as sparse depth data, and using depth data accumulation instruction set, generates dense depth data 543 which the enhanced image data instruction set 544 utilizes to generate the enhanced image data 545.

In some implementations, the ambient light instruction set 530 sending ambient light assessment data 535 to the image enhancement instruction set 540 does not include an analysis of whether or not the image enhancement instruction set 540 should enhance the light intensity images or not. Instead, the image enhancement instruction set 540 determines, based on the ambient light assessment data 535, whether to utilize the resources to enhance the light intensity images before sending to the image data to the 3D representation instruction set 550, or if there is a sufficient level of light intensity, to save the resources needed for the enhancement, and directly send the original image data (e.g., light intensity image data 503) to the 3D representation instruction set 550 without enhancing the light intensity image data (e.g., enhanced RGB data 545).

In some implementations, the ambient light instruction set 530 and/or the image enhancement instruction set 540 can determine different light intensity thresholds depending on the determined type of the light source. For example, inside lighting (e.g., fluorescent light) may need a different threshold (e.g., less than 60% light intensity) versus outside lighting (e.g., the sun) threshold (e.g., less than 70% light intensity) when determining whether or not to enhance the light intensity images with the depth data.

In an example implementation, the environment 500 further includes a 3D representation instruction set 550 that is configured with instructions executable by a processor to obtain the sensor data from sensor(s), enhanced image data from the image enhancement instruction set 540, and generate a 3D model data 554 using one or more techniques. For example, the 3D representation instruction set 550 (e.g., 3D representation instruction set 246 of FIG. 2) analyzes RGB images from a light intensity camera 502 with a sparse depth map from a depth camera 504 (e.g., time-of-flight sensor) and other sources of physical environment information (e.g., camera positioning information such as VIO data 522 from the VIO instruction set 520, or a camera's SLAM system, or the like) to generate 3D representation data 542 (e.g., a 3D model for a virtual object 530 such as table 130 of FIG. 1).

The 3D model data could be 3D representations representing the surfaces in a 3D environment using a 3D point cloud with associated semantic labels. The 3D representations may be 3D bounding boxes for each detected object of interest, such as table 130 and chair 132. In some implementations, the 3D model data 556 is a 3D reconstruction mesh that is generated using a meshing algorithm based on depth information detected in the physical environment that is integrated (e.g., fused) to recreate the physical environment. A meshing algorithm (e.g., a dual marching cubes meshing algorithm, a poisson meshing algorithm, a tetrahedral meshing algorithm, or the like) can be used to generate a mesh representing a room (e.g., physical environment 105) and/or object(s) within a room (e.g., table 130, chair 132, etc.). In some implementations, for 3D reconstructions using a mesh, to efficiently reduce the amount of memory used in the reconstruction process, a voxel hashing approach is used in which 3D space is divided into voxel blocks, referenced by a hash table using their 3D positions as keys. The voxel blocks are only constructed around object surfaces, thus freeing up memory that would otherwise have been used to store empty space. The voxel hashing approach is also faster than competing approaches at that time, such as octree-based methods. In addition, it supports streaming of data between the GPU, where memory is often limited, and the CPU, where memory is more abundant.

In some implementations, the 3D representation instruction set 550 includes an integration instruction set (e.g., integration/segmentation data instruction set 552) that is configured with instructions executable by a processor to obtain the image data (e.g., light intensity data 503, enhanced RGB data 545, depth data 505, etc.) and positioning information (e.g., camera pose information from the VIO instruction set 520) and integrate (e.g., fuse) the subset of image data using one or more known techniques. For example, the image integration instruction set receives depth image data 505 (e.g., sparse depth data) and intensity image data 503 (e.g., RGB) from the image sources (e.g., light intensity camera 502 and depth camera 504), and receives enhanced RGB data 545 from the image enhancement instruction set 540, and integrates the subset of image data and generates 3D data. The 3D data can include a dense 3D point cloud (e.g., imperfect depth maps and camera poses for a plurality of image frames around the object) that is utilized by the 3D representation instruction set 550. The 3D data can also be voxelized.

In some implementations, the 3D representation instruction set 550 includes a semantic segmentation instruction set (e.g., integration/segmentation data instruction set 552) that is configured with instructions executable by a processor to obtain a subset the light intensity image data (e.g., light intensity data 503 and/or enhanced RGB data 545) and identify and segment wall structures (wall, doors, windows, etc.) and objects (e.g., person, table, teapot, chair, vase, etc.) using one or more known techniques. For example, the segmentation instruction set receives a subset of intensity image data 503 from the image sources (e.g., light intensity camera 502), and generates segmentation data (e.g., semantic segmentation data such as RGB-S data). In some implementations, a segmentation instruction set uses a machine learning model, where a semantic segmentation model may be configured to identify semantic labels for pixels or voxels of image data. In some implementations, the machine learning model is a neural network (e.g., an artificial neural network), decision tree, support vector machine, Bayesian network, or the like.

In some implementations, the image composition pipeline may include virtual content (e.g., a virtual box placed on the table 130 in FIG. 1) that is generated for an extended reality (XR) environment. In some implementations, the operating system 230 includes built in XR functionality, for example, including a XR environment application or viewer that is configured to be called from the one or more applications 240 to display a XR environment within a user interface. For example, the systems described herein may include a XR instruction set that is configured with instructions executable by a processor to provide a XR environment that includes depictions of a physical environment including real physical objects and virtual content. A XR instruction set can generate virtual depth data (e.g., depth images of virtual content) and virtual intensity data (e.g., light intensity images (e.g., RGB) of the virtual content). For example, one of the applications 240 for the device 120 could include a XR instruction set that is configured with instructions executable by a processor to provide a XR environment that includes depictions of a physical environment including real objects or virtual objects. The virtual objects may be positioned based on the detection, tracking, and representing of objects in 3D space relative to one another based on stored 3D models of the real objects and the virtual objects, for example, using one or more of the techniques disclosed herein.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at an electronic device having a processor:
   obtaining an image of a physical environment from a first sensor, each pixel of the image corresponding to an amount of light;
   obtaining depth data of the physical environment via a second sensor;
   determining reflectivity data of at least a portion of the physical environment based on the depth data;
   determining that an amount of ambient light in the obtained image is less than a sufficiency threshold based on ambient light sensor data;
   based on the amount of ambient light in the obtained image being less than the sufficiency threshold, determining to utilize an image enhancement algorithm; and
   utilizing the image enhancement algorithm to enhance the obtained image by changing an intensity value or color value of one or more pixels of the obtained image based on the depth data and the determined reflectivity data of the at least the portion of the physical environment.

2. The method of claim 1, further comprising:
   determining a reflectivity pattern of the physical environment from the second sensor or another sensor; and
   enhancing the image based on the reflectivity pattern.

3. The method of claim 1, wherein the second sensor is a LIDAR sensor that acquires the depth data.

4. The method of claim 1, wherein the image from the first sensor comprises first image data, the method further comprising:
   obtaining second image data from at least one other sensor; and
   aligning, based on the depth data, the first image data from the first sensor and the second image data from the at least one other sensor.

5. The method of claim 1, wherein a machine learning model enhances the image based on the depth data, the reflectivity data, and ambient light data.

6. The method of claim 1, wherein determining the amount of ambient light in the obtained image is based on obtaining ambient light data from an ambient light sensor (ALS) of the physical environment, the ambient light data corresponding to diffuse light received by the ALS in the physical environment, the physical environment comprising a light source; and enhancing the image based on the ambient light data.

7. The method of claim 6, further comprising:
   determining a type of light source for the light source in the physical environment based on the ambient light data; and
   enhancing the image based on the type of light source.

8. The method of claim 1, wherein the image is captured in low ambient light conditions, wherein enhancing the image comprises brightening or adding color to one or more of the pixels of the image.

9. The method of claim 1, further comprising:
obtaining a three-dimensional (3D) representation of the physical environment that was generated based on the depth data and image data from the enhanced image, wherein the 3D representation is associated with 3D semantic data;
determining locations of objects in the physical environment based on the 3D representation; and
providing pedestrian navigation to a user based on the 3D representation and the locations of the objects in the physical environment.

10. The method of claim 9, further comprising:
determining a relative pose of a head of the user; and
providing spatialized audio feedback to the pedestrian for the locations of the objects based on the relative pose of a head of the user.

11. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the one or more processors to perform operations comprising:
obtaining an image of a physical environment from a first sensor, each pixel of the image corresponding to an amount of light;
obtaining depth data of the physical environment via a second sensor;
determining reflectivity data of at least a portion of the physical environment based on the depth data;
determining that an amount of ambient light in the obtained image is less than a sufficiency threshold based on ambient light sensor data;
based on the amount of ambient light in the obtained image being less than the sufficiency threshold, determining to utilize an image enhancement algorithm; and
utilizing the image enhancement algorithm to enhance the obtained image by changing an intensity value or color value of one or more pixels of the obtained image based on the depth data and the determined reflectivity data of the at least the portion of the physical environment.

12. The device of claim 11, wherein the instructions cause the one or more processors to perform operations further comprising:
determining a reflectivity pattern of the physical environment from the second sensor or another sensor; and
enhancing the image based on the reflectivity pattern.

13. The device of claim 11, wherein the image from the first sensor comprises first image data, and wherein the instructions cause the one or more processors to perform operations further comprising:
obtaining second image data from at least one other sensor; and
aligning, based on the depth data, the first image data from the first sensor and the second image data from the at least one other sensor.

14. The device of claim 11, wherein a machine learning model enhances the image based on the depth data, the reflectivity data, and ambient light data.

15. The device of claim 11, wherein determining the amount of ambient light in the obtained image is based on obtaining ambient light data from an ambient light sensor (ALS) of the physical environment, the ambient light data corresponding to diffuse light received by the ALS in the physical environment, the physical environment comprising a light source.

16. The device of claim 15, wherein the instructions cause the one or more processors to perform operations further comprising:
determining a type of light source for the light source in the physical environment based on the ambient light data; and
enhancing the image based on the type of light source.

17. The device of claim 11, the image is captured in low ambient light conditions, wherein enhancing the image comprises brightening or adding color to one or more of the pixels of the image.

18. A non-transitory computer-readable storage medium, storing computer-executable program instructions on a computer to perform operations comprising:
obtaining an image of a physical environment from a first sensor, each pixel of the image corresponding to an amount of light;
obtaining depth data of the physical environment via a second sensor;
determining reflectivity data of at least a portion of the physical environment based on the depth data;
determining that an amount of ambient light in the obtained image is less than a sufficiency threshold based on ambient light sensor data;
based on the amount of ambient light in the obtained image being less than the sufficiency threshold, determining to utilize an image enhancement algorithm; and
utilizing the image enhancement algorithm to enhance the obtained image by changing an intensity value or color value of one or more pixels of the obtained image based on the depth data and the determined reflectivity data of the at least the portion of the physical environment.

* * * * *

UNITED STATES PATENT AND TRADEMARK OFFICE
CERTIFICATE OF CORRECTION

| | | |
|---|---|---|
| PATENT NO. | : 12,100,194 B1 | Page 1 of 1 |
| APPLICATION NO. | : 17/356642 | |
| DATED | : September 24, 2024 | |
| INVENTOR(S) | : Mohammad Haris Baig, Praveen Gowda Ippadi Veerabhadre Gowda and Quinton L. Petty | |

It is certified that error appears in the above-identified patent and that said Letters Patent is hereby corrected as shown below:

In the Claims

Claim 6, Column 16, Line 61 and 62 reads:
"...a light source; and enhancing the image based on the ambient light data."
Should read:
--...a light source.--

Signed and Sealed this
Twenty-ninth Day of October, 2024

*Katherine Kelly Vidal*

Katherine Kelly Vidal
*Director of the United States Patent and Trademark Office*